United States Patent [19]

Garcia, Jr.

[11] Patent Number: 4,871,231

[45] Date of Patent: Oct. 3, 1989

[54] THREE DIMENSIONAL COLOR DISPLAY AND SYSTEM

[75] Inventor: Felix Garcia, Jr., Williamson, Tex.

[73] Assignee: Texas Instruments Incorporated, Dallas, Tex.

[21] Appl. No.: 109,545

[22] Filed: Oct. 16, 1987

[51] Int. Cl.$^4$ ............................................. G02B 27/22
[52] U.S. Cl. ........................................ 350/144; 358/3; 358/63
[58] Field of Search ....................... 350/144, 130, 6.91, 350/6.5, 574, 508, 538, 120, 96.24, 174; 358/3, 60, 63, 201, 231, 89

[56] References Cited

U.S. PATENT DOCUMENTS

| | | | |
|---|---|---|---|
| 3,140,415 | 7/1964 | Ketchpel | 358/88 |
| 3,510,571 | 5/1970 | Bierdermann | 358/63 |
| 3,569,988 | 3/1971 | Schmidt et al. | 358/3 |
| 3,818,129 | 6/1974 | Yamamoto | 358/60 |
| 3,825,336 | 7/1974 | Reynolds | 350/96.16 |
| 3,894,182 | 7/1975 | Yamamoto et al. | 358/63 |
| 4,023,158 | 5/1977 | Corcoran | 358/88 |
| 4,099,831 | 7/1978 | Freeman | 350/508 |
| 4,168,106 | 9/1979 | Freeman | 359/120 |
| 4,567,769 | 2/1986 | Barkhoudarian | 350/96.24 |

Primary Examiner—Jon W. Henry
Attorney, Agent, or Firm—James T. Comfort; N. Rhys Merrett; Melvin Sharp

[57] ABSTRACT

The disclosure relates to a three dimensional color display wherein controlled modulated laser light of predetermined different frequencies is transmitted via fiber optics and combined in a fiber optic coupler to provide a combined light beam. This light beam is transmitted along a fiber optic path wherefrom it is collimated and a three dimensional color display is formed therefrom. The three dimensional display is provided by an x-y scanner for forming a two dimensional image from the light on the single fiber optic path, a rotating display screen for causing each point on the two dimensional image to move along a path making an acute angle with the two dimensional image wherein operation of one of the scanner and the rotating display screen is controlled relative to the other.

8 Claims, 1 Drawing Sheet

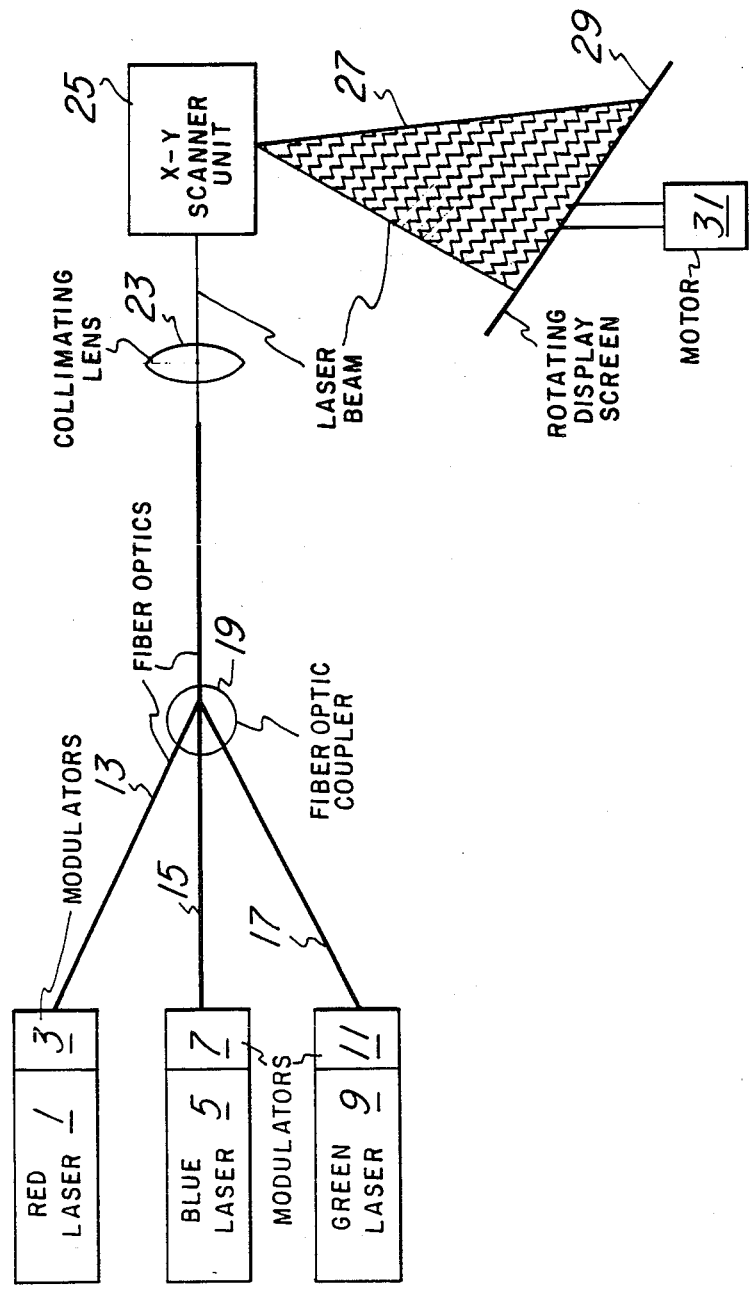

THREE DIMENSIONAL COLOR DISPLAY AND SYSTEM

BACKGROUND OF THE INVENTION 1. Field of the Invention

1. This invention relates to a three dimensional color display and, more specifically, to such a system utilizing plural modulated lasers projecting different colors through a fiber optic system.

2. Brief Description of the Prior Art

It has been known in the prior art to modulate or scan a beam, such as a laser beam and then to project the scanned beam onto a screen. Examples of such systems are set forth in Baker Patent Nos. 3,471,641 and 3,549,800.

It has also been long desired to provide a three dimensional display. Prior art systems for creating such a display have involved moving a flat plate mirror or flexing a plastic mirror to reflect a CRT image to create a volume display. Similar techniques have employed a Mylar membrane stretched over a metal ring and silvered on the from surface, such mirror being vibrated to reflect the information displayed on the CRT in synchronism with the mirror motion. Such techniques and techniques for converting a cathode ray tube two dimensional display into a three dimensional image are discussed in the article "Terminal Puts 3-Dimensional Graphics on Solid Ground", by Harry S. Stover, *Electronics*, July 28, 1961.

Prior art three dimensional display techniqes were limited because of their use with CRT screens in that the produced image may be viewed only from selected angles. Moreover, such prior art systems have generally not been able to produce real time images and have been limited in the possible vibration frequencies of the screens. Furthermore, the use of vibrating mirrors has created difficulties due to the relatively large mass of the mirrors which prevent substantial deflections. For example, such prior art systems have generally been capable of providing a mirror displacement of about 0.4 millimeters.

A need thus arose for a simple and economical three dimensional display system that could produce substantial displacement at a variety of frequencies in order to provide three dimensional images which can be viewed from all angles. A system which solved this problem is known wherein the three dimensional display includes a laser which directs a beam of light toward a mirror, the mirror being moved in an X-Y plane by piezoelectric transducers. The reflected light beam is directed to a vibrating screen which is moved by a piezoelectric transducer to form a three dimensional image. This system, while providing the desired result, is limited as to the size of the image displayed since the screen and image size are determined by the size of the piezoelectric transducer. Also, this system is affected by G forces, thereby presenting problems where such forces exist, such as in aircraft.

The above problems have been minimized in accordance with the system described in the continuation application of Garcia et al., Serial No. 231,638, filed Aug. 8, 1988 and assigned to the assignee of the subject application wherein a single laser and modulation system provide a light beam which is directed onto an x-y scanner, the latter providing a two dimensional image on a rotating screen. The rotating screen is positioned so that points on the image are constantly moving along an axis normal to the image plane to provide a three dimensional image. The above noted prior art is incorporated herein by reference. This copending application is incorporated herein by reference. In addition, U.S. Pat. Nos. 1,794,103, 3,682,553 and 3,970,361 set forth typical prior art displays of the above noted type.

The above noted prior art still is unable to adequately provide three dimensional color images wherein the colors can be continually varied on-line.

SUMMARY OF THE INVENTION

In accordance with the present invention, the above noted problem of the prior art is overcome and there is provided a three dimensional color display wherein the colors can be continually varied on-line.

Briefly, the above is accomplished by providing a plurality of different color producing lasers, the colors being predetermined so that all colors including white can be provided by properly combining the colors as is well known in the color television art, for example. In the preferred embodiment, the lasers produce red 633 nm), blue (476 nm) and green (514 nm) light. The light emanating from each laser is separately modulated by an externally controlled acousto-optic modulator to determine the intensity of the beam exiting the modulator. This intensity can include zero light transmission. The outputs of the modulators are transmitted along a fiber optic path to a fiber optic coupler where they are combined by means of a standard fiber optic coupler which is well known in the art. The output of the fiber optic coupler can be any preselected color including white, this depending upon the particular mix of colors and intensity thereof entering the coupler for combination therein. The particular mix and intensity of the colors is controlled by the operation of the modulators in combination. The combined light signal exiting the optic coupler is transmitted along a further fiber optic path to a collimating lens and then focused onto an x-y scanner of the type described in the above noted copending application and the references cited therein. The x-y scanner provides a two dimensional color image which is focused upon a screen of the type disclosed in said copending application. This screen includes a disk-like member connected to the end of a motor shaft. The disk is attached to the shaft of the motor at a 45 degree angle, though this angle can be varied to provide a larger or small height or z-axis dimension, so that, as the disk rotates, a displacement of any given point thereon along the z-axis takes place. The disk can be translucent, such as lucite, so that images can be projected thereon onto the front and/or rear surfaces thereof. The modulation or strobing of the scan is then synchronized with the rotating disk by control of the motor speed and/or the scanning rate of the scanner so that a three dimensional-color-pattern appears on the screen. It can be seen that any point on the x-y scan from the scanner which impinges upon the screen will move along a z-axis direction since the screen or disk at that point produces such z-axis movement. This movement of the displayed image provides the three dimensional affect. The adjustment of the angle between the disk surface and the x-y plane of the scanned x-y image will determine the z dimension or height of the three dimensional image, the disk angle being adjustable on-line, if so desired.

The above noted-prior art is incorporated herein by reference. In addition, U.S. Pat. Nos. 1,223,459, 2,589,569, 3,757,106, 3,825,335, 3,825,336, and 4,535,394 set forth typical prior art displays of generally the above noted type.

BRIEF DESCRIPTION OF THE DRAWING

The FIGURE is a schematic diagram of a circuit embodiment in accordance with the present invention.

DESCRIPTION OF THE PREFERRED EMBODIMENT

In accordance with the present invention, the above noted problems of the prior art are minimized and there is provided a system capable of providing a three dimensional display in color with on-line control of the color, using relatively simple and inexpensive circuitry as set forth in the FIGURE.

The system includes a red laser 1 providing red light of frequency (633 nm) with an externally controlled modulator 3 which controls the intensity as well as the duty cycle of the output from its associated laser. The modulator 3 can be controlled to provide light pulses therefrom whereby, at predetermined times, the light intensity becomes zero. Also provided are a laser 5 providing blue light of frequency (476 nm) with its associated modulator 7 and a laser 9 providing green light of frequency (514 nm) with its associated modulator 11. The modulators 7 and 11 are the same as and operate in identical manner to modulator 3.

The modulated light outputs of each of the modulators 3, 7 and 11 are transmitted along fiber optic legs 13, 15 and 17 respectively to a fiber optic coupler 19 wherein the modulated light is combined in well known and standard manner. The output of the coupler 19 is a color which is determined by the particular mix and intensity of the modulated light which entered therein, this output being transmitted along fiber optic line 21 and through a collimating lens 23 to an x-y scanner 25. A typical scanner is set forth in the above noted copending application Ser. No. 231,638, filed Aug. 8, 1988. The scanner receives the collimated light passing through the lens 23 and provides a two dimensional image therefrom. This two dimensional image 27 is reflected onto a rotating generally flat screen 29 which makes an acute angle with the two dimensional image, the screen 29 and its operation being discussed in detail in the above noted copending application Ser. No. 231,638 which is incorporated herein by reference. The screen 29 is rotated by a motor 31, the rotational speed of the motor being synchronized with the scanning rate of the scanner 25 as discussed in said copinding application. Any point of light in the x-y or two dimensional image plane impinging upon the screen 29 will display a harmonic type motion in the z-plane due to the similar movement of points on the screen. Accordingly, if the scanning rate of the scanner and the rotation rate of the screen are sufficiently high, light impinging upon the screen at any point on the screen will move along the z-axis sufficiently rapidly to appear as a complete line, as is well known. The result is a three dimensional color display with height determined by the angle of the screen.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modification.

I claim:

1. A color display system comprising:
   (a) a plurality of light sources, each of different predetermined frequency;
   (b) light modulating means associated with each said light source for continually and variably controlling the intensity of light of each of said predetermined frequency;
   (c) fiber optic means for receiving said light of said predetermined frequencies from said light modulating means along individual paths coupled to said light modulating means, combining said received light from each said path and transmitting said combined light along a single fiber optic path; and
   (d) display means for receiving said combined light transmitted along said single fiber optic path to provide a three dimensional image of the light transmitted along said single fiber optic path of a color determined by the intensity of each of the light sources as controlled by the light modulating means, said display means providing a three dimensional display including:
   (e) scanning means forming and projecting therefrom a two dimensional image from said light on said single fiber optic path,
   (f) a generally flat display screen substantially defining a plane, and
   (g) means for rotating the generally flat display screen about an axis of rotation passing obliquely through said plane of said display screen.

2. A display system as set forth in claim 1 wherein said light sources are lasers, each laser providing a light output of different frequency.

3. A display system as set forth in claim 1 where said plurality of light sources comprising three such sources.

4. A display system as set forth in claim 2 where said plurality of light sources comprises three such sources.

5. A display as set forth in claim 1 wherein said predetermined frequencies consist of frequencies for producing white light.

6. A display as set forth in claim 2 wherein said predetermined frequencies consist of frequencies for producing white light.

7. A display as set forth in claim 3 wherein said predetermined frequencies consist of frequencies for producing white light.

8. A display as set forth in claim 4 wherein said predetermined frequencies consist of frequencies for producing white light.

* * * * *